United States Patent
Karmon et al.

(10) Patent No.: US 10,929,702 B2
(45) Date of Patent: Feb. 23, 2021

(54) AUTOMATIC IMAGE FEATURE REMOVAL

(71) Applicant: SYNC-RX, LTD, Netanya (IL)

(72) Inventors: Nili Karmon, Rancho Cordova, CA (US); Sarit Semo, Eindhoven (NL)

(73) Assignee: SYNC-RX, LTD, Netanya (IL)

( * ) Notice: Subject to any disclaimer, the term of this patent is extended or adjusted under 35 U.S.C. 154(b) by 384 days.

(21) Appl. No.: 15/759,477

(22) PCT Filed: Sep. 9, 2016

(86) PCT No.: PCT/EP2016/071362
§ 371 (c)(1),
(2) Date: Mar. 12, 2018

(87) PCT Pub. No.: WO2017/050594
PCT Pub. Date: Mar. 30, 2017

(65) Prior Publication Data
US 2020/0257919 A1    Aug. 13, 2020

Related U.S. Application Data

(60) Provisional application No. 62/216,574, filed on Sep. 10, 2015.

(51) Int. Cl.
*G06K 9/34* (2006.01)
*G06K 9/20* (2006.01)
(Continued)

(52) U.S. Cl.
CPC ........... *G06K 9/346* (2013.01); *G06K 9/2054* (2013.01); *G06K 9/46* (2013.01); *G06T 7/0012* (2013.01);
(Continued)

(58) Field of Classification Search
None
See application file for complete search history.

(56) References Cited

U.S. PATENT DOCUMENTS

| 4,817,166 A | * | 3/1989 | Gonzalez | G06K 9/3258 382/105 |
| 6,738,512 B1 | * | 5/2004 | Chen | G06K 9/325 382/176 |

(Continued)

FOREIGN PATENT DOCUMENTS

| JP | 2012217631 A | 11/2012 |
| WO | 20080107905 A1 | 12/2008 |

(Continued)

OTHER PUBLICATIONS

Henning Muller, "Automated Object Extraction for Medical Image Retrieval Using the Insight Toolkit (ITK)", Jan. 1, 2006 (H.T. Ng et al. (Eds.): AIRS 2006, LNCS 4182, Springer-Verlag Berlin Heidelberg, p. 478, paragraph 2, pp. 476-488.

(Continued)

*Primary Examiner* — Michelle M Entezari

(57) ABSTRACT

Apparatus and methods are described including receiving, via a computer processor, at least one image of a portion of a subject's body. One or more features that are present within the image of the portion of the subject's body, and that were artificially added to the image subsequent to acquisition of the image, are identified. In response thereto, an output is generated on an output device.

17 Claims, 6 Drawing Sheets

(51) Int. Cl.
*G06K 9/46* (2006.01)
*G06T 7/00* (2017.01)

(52) U.S. Cl.
CPC ..... *G06K 2209/01* (2013.01); *G06K 2209/05* (2013.01); *G06T 2207/30004* (2013.01)

(56) References Cited

U.S. PATENT DOCUMENTS

| | | | |
|---|---|---|---|
| 8,175,413 B1* | 5/2012 | Ioffe | G06K 9/20 382/283 |
| 8,660,296 B1* | 2/2014 | Ioffe | G06K 9/00744 382/100 |
| 8,700,130 B2 | 4/2014 | Iddan et al. | |
| 8,781,193 B2 | 7/2014 | Steinberg et al. | |
| 9,216,065 B2 | 12/2015 | Cohen | |
| 9,305,334 B2 | 4/2016 | Barzelay et al. | |
| 9,629,571 B2 | 4/2017 | Tolkowsky | |
| 9,987,434 B2* | 6/2018 | Rodiera Olive | H04N 5/77 |
| 10,303,988 B1* | 5/2019 | Long | H04N 5/2356 |
| 2005/0078223 A1* | 4/2005 | Liu | G06K 9/325 348/701 |
| 2006/0059510 A1* | 3/2006 | Huang | H04N 19/87 725/32 |
| 2007/0211170 A1* | 9/2007 | Ramaswamy | H04N 21/44008 348/552 |
| 2008/0187225 A1 | 8/2008 | Katsuyama | |
| 2008/0221440 A1 | 9/2008 | Iddan | |
| 2011/0211812 A1* | 9/2011 | Tzoukermann | H04N 21/233 386/250 |
| 2014/0094691 A1 | 4/2014 | Steinberg et al. | |
| 2015/0058877 A1* | 2/2015 | Lakkundi | H04N 21/439 725/19 |
| 2015/0071490 A1* | 3/2015 | Fukata | G08G 1/166 382/103 |

FOREIGN PATENT DOCUMENTS

| | | |
|---|---|---|
| WO | 20090153794 A1 | 12/2009 |
| WO | 2010058398 A1 | 5/2010 |
| WO | 2011145094 A1 | 11/2011 |
| WO | 2012014212 A1 | 2/2012 |
| WO | 20120176191 A1 | 12/2012 |
| WO | 2013175472 A1 | 11/2013 |
| WO | 2014002095 A1 | 3/2014 |
| WO | 2015155770 A1 | 10/2015 |
| WO | 20150173821 A1 | 11/2015 |

OTHER PUBLICATIONS

Xu, S. et al: "A New Pivoting and Iterative Text Detection Algorithm for Biomedical Images" Journal of Biomedical Informatics Dec. 1, 2010; 43(6): 924-931.

S.T.C Wong; "Medical Image Database", Jan. 1, 1998, Springer, p. 304-306, 311, 319-321.

* cited by examiner

AUTOMATIC IMAGE FEATURE REMOVAL

CROSS-REFERENCE TO PRIOR APPLICATIONS

This application is the U.S. National Phase application under 35 U.S.C. § 371 of International Application No. PCT/EP2016/071362, filed on Sep. 9, 2016, which claims the benefit of U.S. Provisional Application No. 62/216,574, filed on Sep. 10, 2015. These applications are hereby incorporated by reference herein.

FIELD OF EMBODIMENTS OF THE INVENTION

Some applications of the present invention generally relate to automatic image processing. Specifically, some applications of the present invention relate to medical imaging and analysis of such images.

BACKGROUND

Medical imaging is used to treat and diagnose diseases. There are a large number of imaging modalities that are used to generate medical images, including video, fluoroscopy, angiography, ultrasound, CT, MR, PET, PET-CT, CT angiography, SPECT, Gamma camera imaging, Optical Coherence Tomography (OCT), Near-Infra-Red Spectroscopy (NIRS), Vibration Response Imaging (VRI), optical imaging, infrared imaging, electrical mapping imaging, other forms of functional imaging, Focused Acoustic Computed Tomography (FACT), Optical Frequency Domain Imaging (OFDI). Many medical imaging systems are configured to add features (e.g., icons, and/or alphanumeric features) to images that have been acquired by the image-acquisition unit of the system. For example, such data may include information regarding the subject of the imaging, and/or data relating to measurements that have been performed upon the image.

SUMMARY OF EMBODIMENTS

For some applications of the present invention, a computer processor receives an image of a portion of a subject's body from an image-processing system. The computer processor identifies features that are present within the image that were artificially added to the image by the image-processing system, subsequent to acquisition of the image. In response thereto, the computer processor generates an output on an output device. For example, the computer processor may drive a display to display the image with the identified features removed from the displayed image. Alternatively or additionally, the computer processor may perform measurements upon the image, and may exclude the identified features from being included in the measurements. The computer processor may then generate an indication of the measurements upon the output device.

The artificially-added features that are identified by the computer processor may include features that are added by the image-processing system in order to identify the subject, to show measured data associated with the subject, to identify the image processing system (for example, the image may include a logo associated with the manufacturer of the image-processing system), to classify the image as a certain type of image, or to perform a different function. The features may include alphanumeric characters, icons, pictures, and/or any other type or shape of feature. Many medical imaging systems are configured to add such features (e.g., icons, and/or alphanumeric data) to images that have been acquired by an imaging device. For some applications, the computer processor identifies the artificially-added features by identifying features within the image that have alphanumeric characteristics.

There is therefore provided, in accordance with some applications of the present invention, a method including:
receiving, via at least one computer processor, at least one image of a portion of a subject's body;
using the at least one computer processor, identifying one or more features that are present within the image of the portion of the subject's body that were artificially added to the image, subsequent to acquisition of the image; and
in response thereto, generating an output on an output device.

For some applications, generating the output on the output device includes driving a display to display the image with the identified features removed from the displayed image.

For some applications, the method further comprises using the computer processor, performing measurements upon the image, by excluding the identified features from being included in the measurements, and generating the output includes generating an indication of the measurements upon the output device.

For some applications, identifying the one or more features includes determining that the one or more features are located within a given distance of an edge of the image, and identifying the one or more features as having been artificially added to the image, subsequent to acquisition of the image, at least partially in response thereto.

For some applications, identifying the one or more features includes identifying one or more features that have alphanumeric characteristics that are present within the image.

For some applications, identifying the one or more features includes identifying a set of pixels as defining a line and identifying the set of pixels as corresponding to a feature that has been artificially added to the image subsequent to acquisition of the image, at least partially in response thereto.

For some applications, identifying the one or more features includes identifying a region of the image within which a density of straight lines exceeds a threshold and identifying the region as containing a feature that has been artificially added to the image subsequent to acquisition of the image, at least partially in response thereto.

For some applications, identifying the one or more features includes determining that a density of horizontal and vertical gradients within a given region of the image exceeds a threshold and identifying the region as containing a feature that has been artificially added to the image subsequent to acquisition of the image, at least partially in response thereto.

For some applications, identifying the one or more features includes:
determining that, in the image, a difference in intensity between a first pixel and at least one second pixel within a given distance from the first pixel exceeds a threshold;
determining that a difference in intensity between a value of the first pixel in the image and a value of the first pixel in one or more additional images of the portion of the subject's body is less than a threshold amount; and
identifying a region that contains the first pixel as containing a feature that has been artificially added to the image subsequent to acquisition of the image, at least partially in response thereto.

There is further provided, in accordance with some applications of the present invention, apparatus including:
an imaging device configured to acquire an image of a portion of a body of a subject;
an output device; and
at least one computer processor configured to:
receive the image of the portion of the subject's body;
determine that one or more features are present within the image of the portion of the subject's body that were artificially added to the image, subsequent to acquisition of the image by the imaging device; and
in response thereto, generate an output on the output device.

For some applications, the computer processor is configured to generate the output by driving a display to display the image with the identified features removed from the displayed image.

For some applications, the computer processor is configured to perform measurements upon the image, by excluding the identified features from being included in the measurements, and the computer processor is configured to generate the output by generating an indication of the measurements upon the output device.

For some applications, the computer processor is configured to identify the one or more features by determining that the one or more features are located within a given distance of an edge of the image, and identifying the one or more features as having been artificially added to the image, subsequent to acquisition of the image, at least partially in response thereto.

For some applications, the computer processor is configured to identify the one or more features by identifying one or more features that have alphanumeric characteristics that are present within the image.

For some applications, the computer processor is configured to identify the one or more features by identifying a set of pixels as defining a line and identifying the set of pixels as corresponding to a feature that has been artificially added to the image subsequent to acquisition of the image, at least partially in response thereto.

For some applications, the computer processor is configured to identify the one or more features by identifying a region of the image within which a density of straight lines exceeds a threshold and identifying the region as containing a feature that has been artificially added to the image subsequent to acquisition of the image, at least partially in response thereto.

For some applications, the computer processor is configured to identify the one or more features by determining that a density of horizontal and vertical gradients within a given region of the image exceeds a threshold and identifying the region as containing a feature that has been artificially added to the image subsequent to acquisition of the image, at least partially in response thereto.

For some applications, the computer processor is configured to identify the one or more features by:
determining that, in the image, a difference in intensity between a first pixel and at least one second pixel within a given distance from the first pixel exceeds a threshold;
determining that a difference in intensity between a value of the first pixel in the image and a value of the first pixel in one or more additional images of the portion of the subject's body is less than a threshold amount; and
identifying a region that contains the first pixel as containing a feature that has been artificially added to the image subsequent to acquisition of the image, at least partially in response thereto.

There is additionally provided, in accordance with some applications of the present invention, a computer software product, for use with an imaging device configured to acquire an image of a portion of a body of a subject, and an output device, the computer software product including a non-transitory computer-readable medium in which program instructions are stored, which instructions, when read by a computer cause the computer to perform the steps of: receiving at least one image of a portion of a subject's body; identifying one or more features that are present within the image of the portion of the subject's body that were artificially added to the image, subsequent to acquisition of the image; and, in response thereto, generating an output on the output device.

The present invention will be more fully understood from the following detailed description of embodiments thereof, taken together with the drawings, in which:

BRIEF DESCRIPTION OF THE D WINGS

Figure 2:
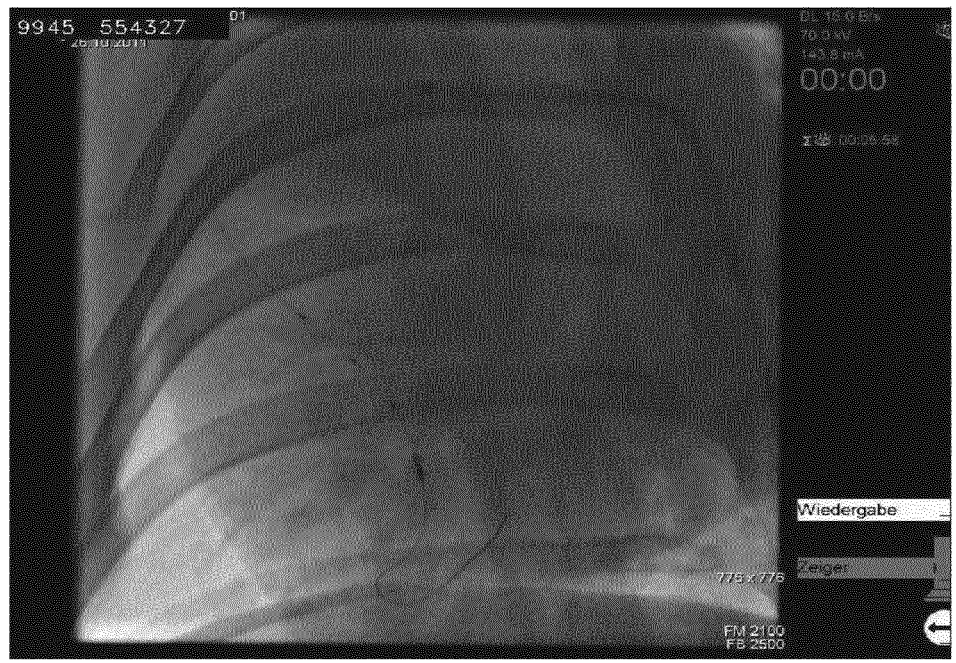
FIG. 2 is an example of an extraluminal fluoroscopic image of a subject's chest that is image-processed by a computer processor, in accordance with some applications of the present invention.
Figure 3A:
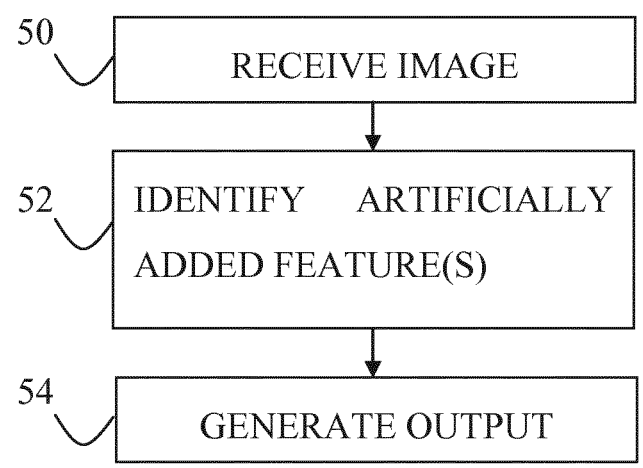
Figure 3B:
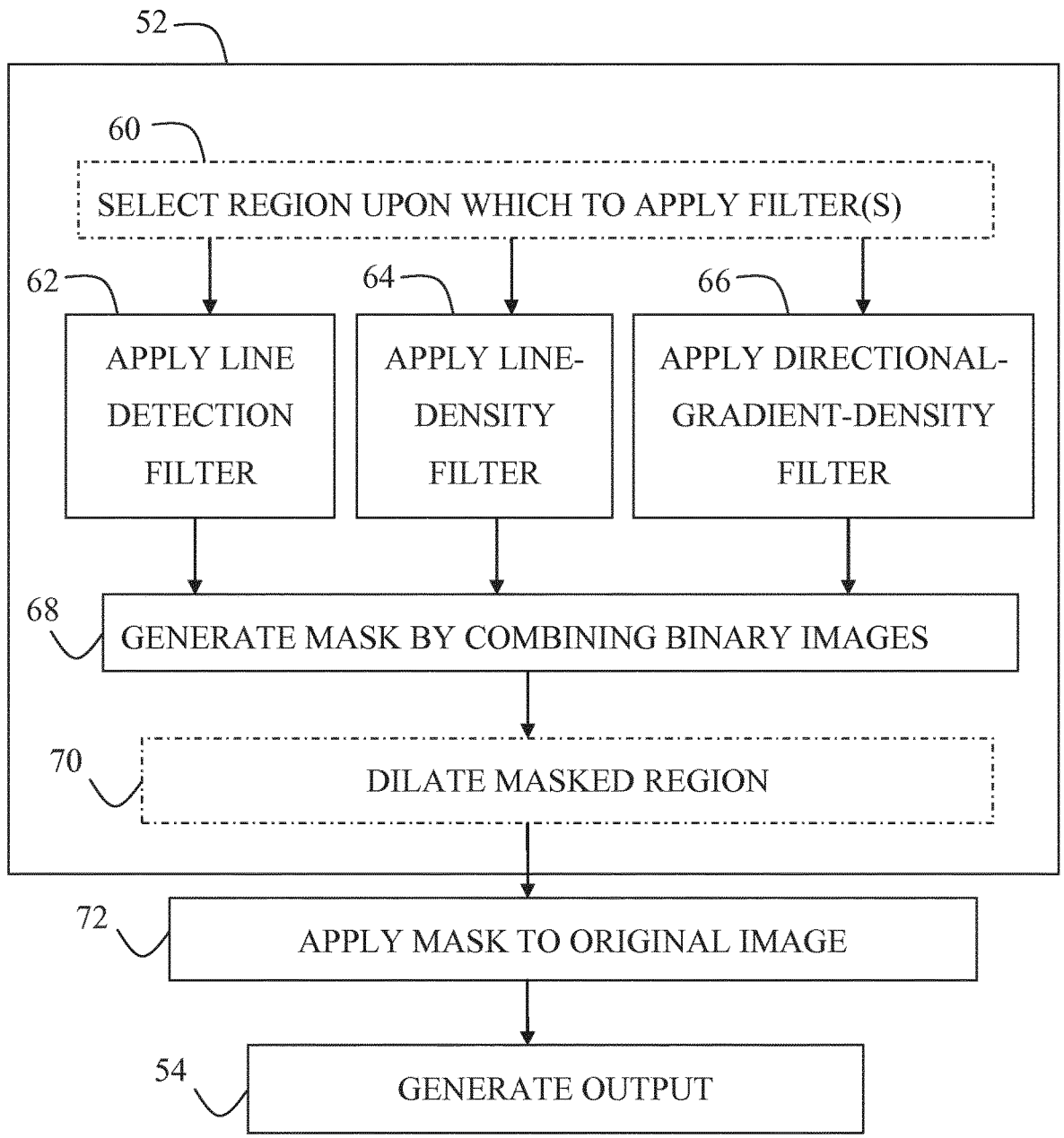
Figure 4A:
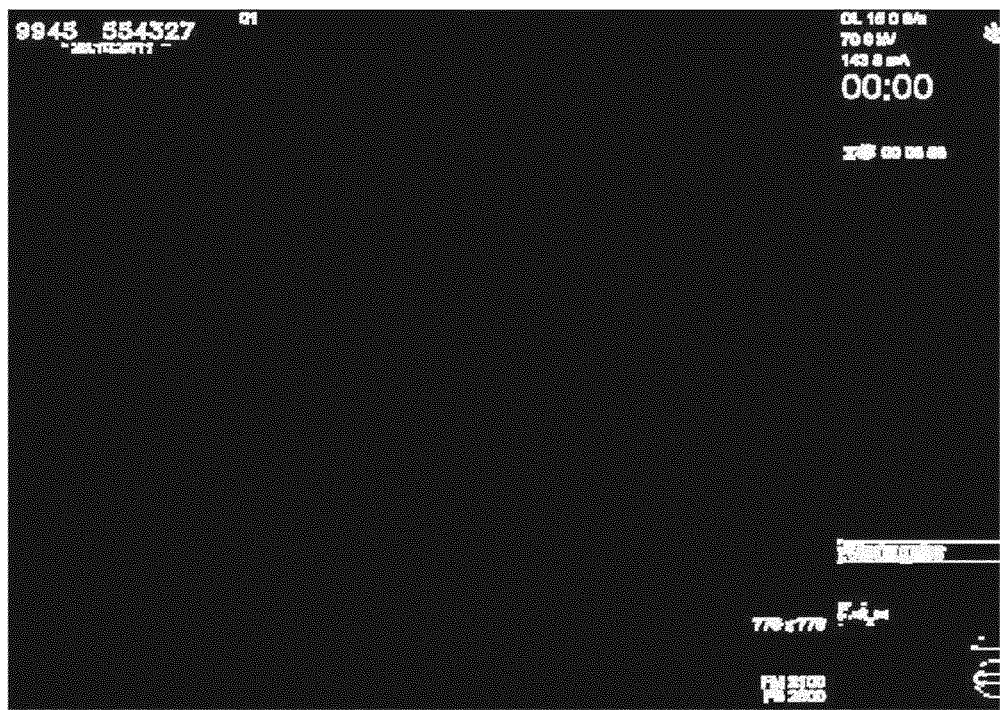
Figure 4B:
Figure 4C:
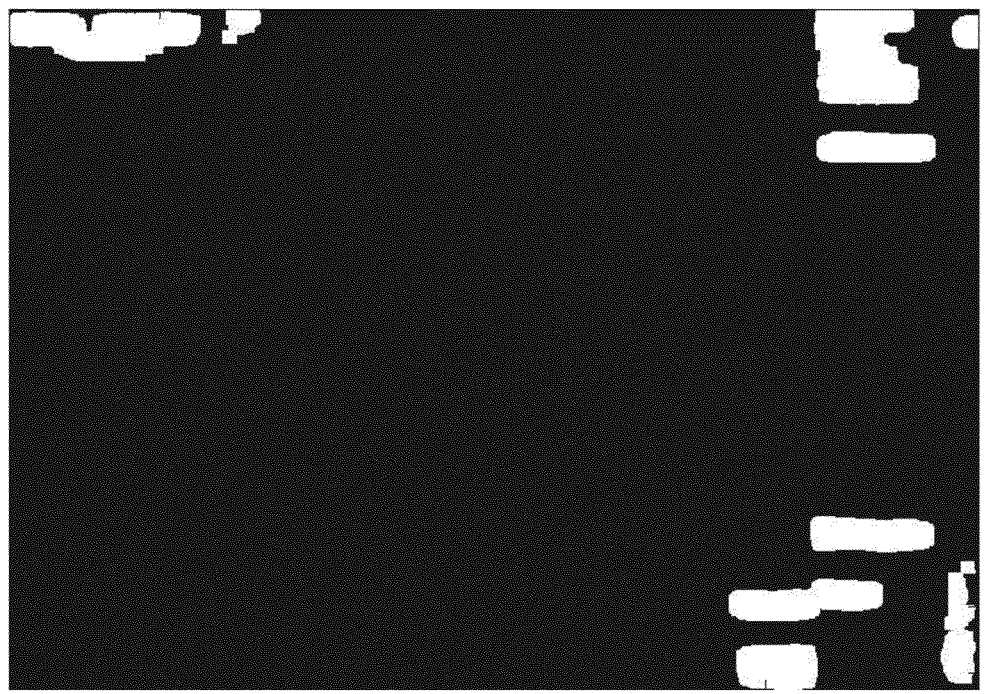
Figure 4D:
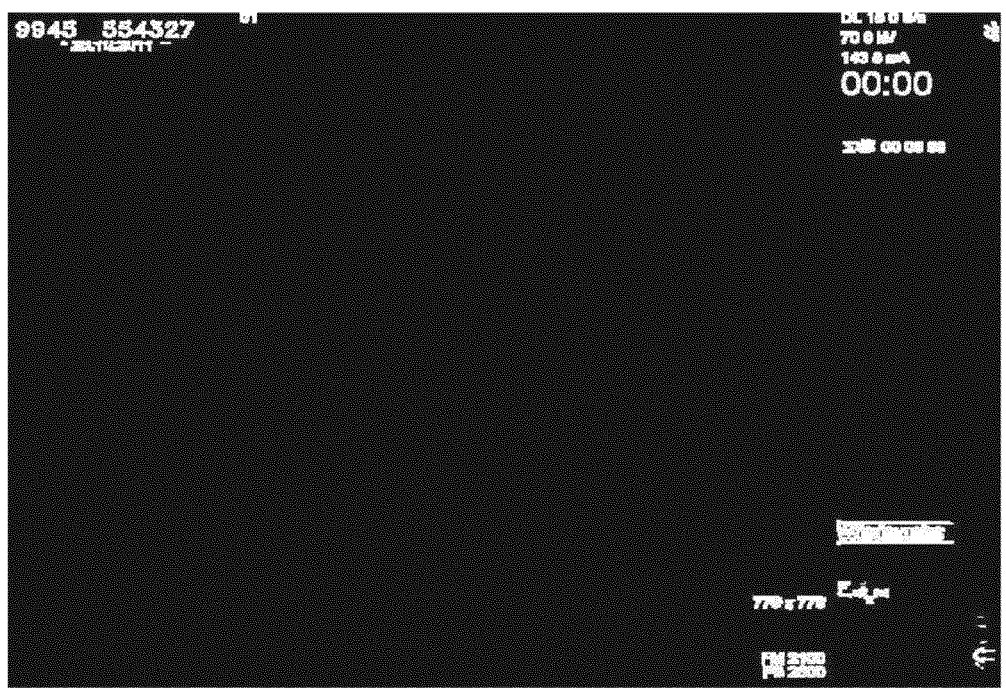
Figure 5:
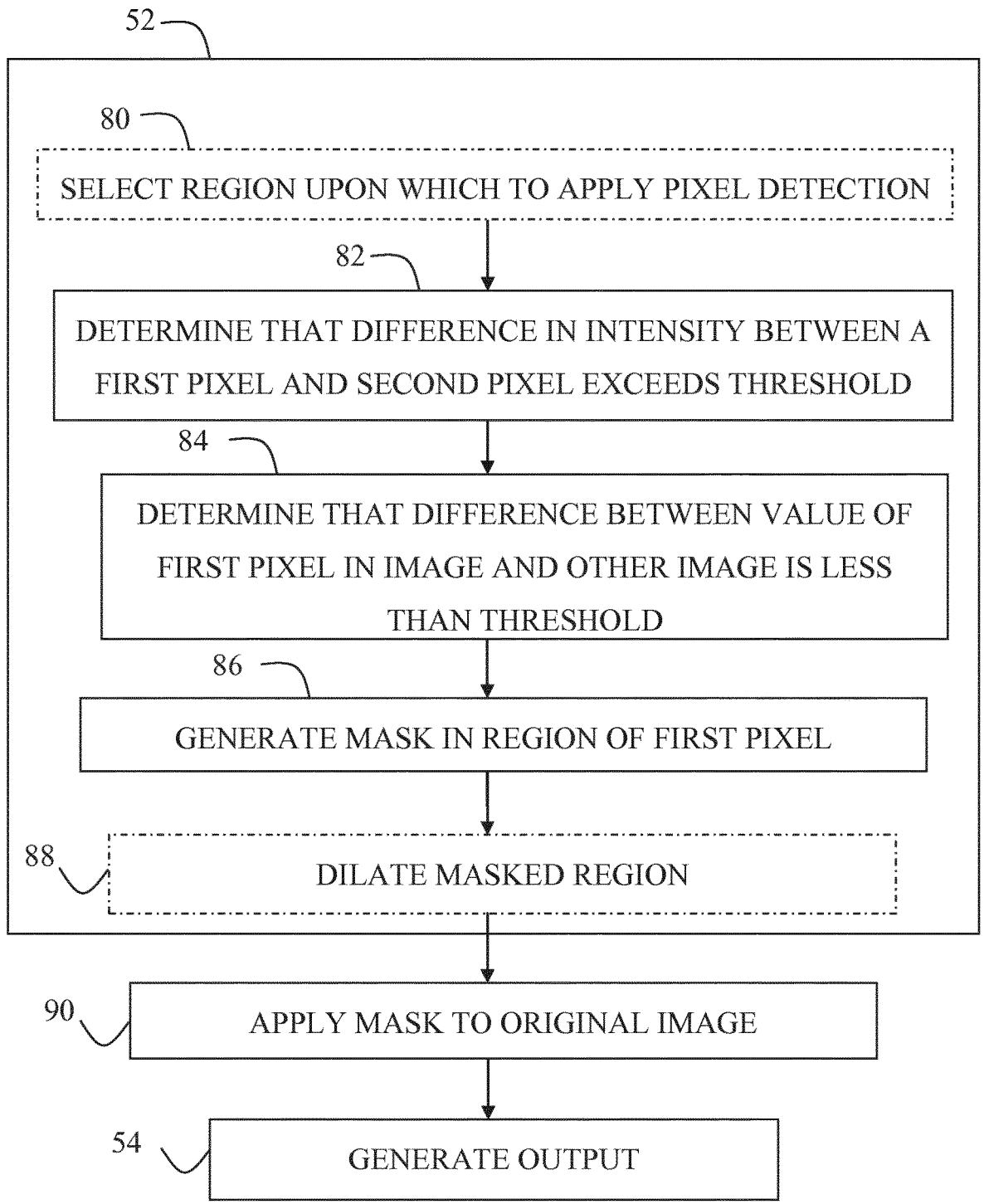

FIGS. 3A-B are flowcharts showing steps of an algorithm that is performed by a processor, in accordance with some applications of the present invention;

FIGS. 4A-C are examples of binary images that are generated by applying steps of the flowchart shown in FIG. 3B to the image shown in FIG. 2, in accordance with some applications of the present invention;

FIG. 4D is a mask image that was generated by combining the binary images shown in FIGS. 4A-C, in accordance with some applications of the present invention; and FIG. 5 a flowchart showing steps of an algorithm that is performed by a processor, in accordance with some applications of the present invention.

DETAILED DESCRIPTION OF EMBODIMENTS

Figure 1:
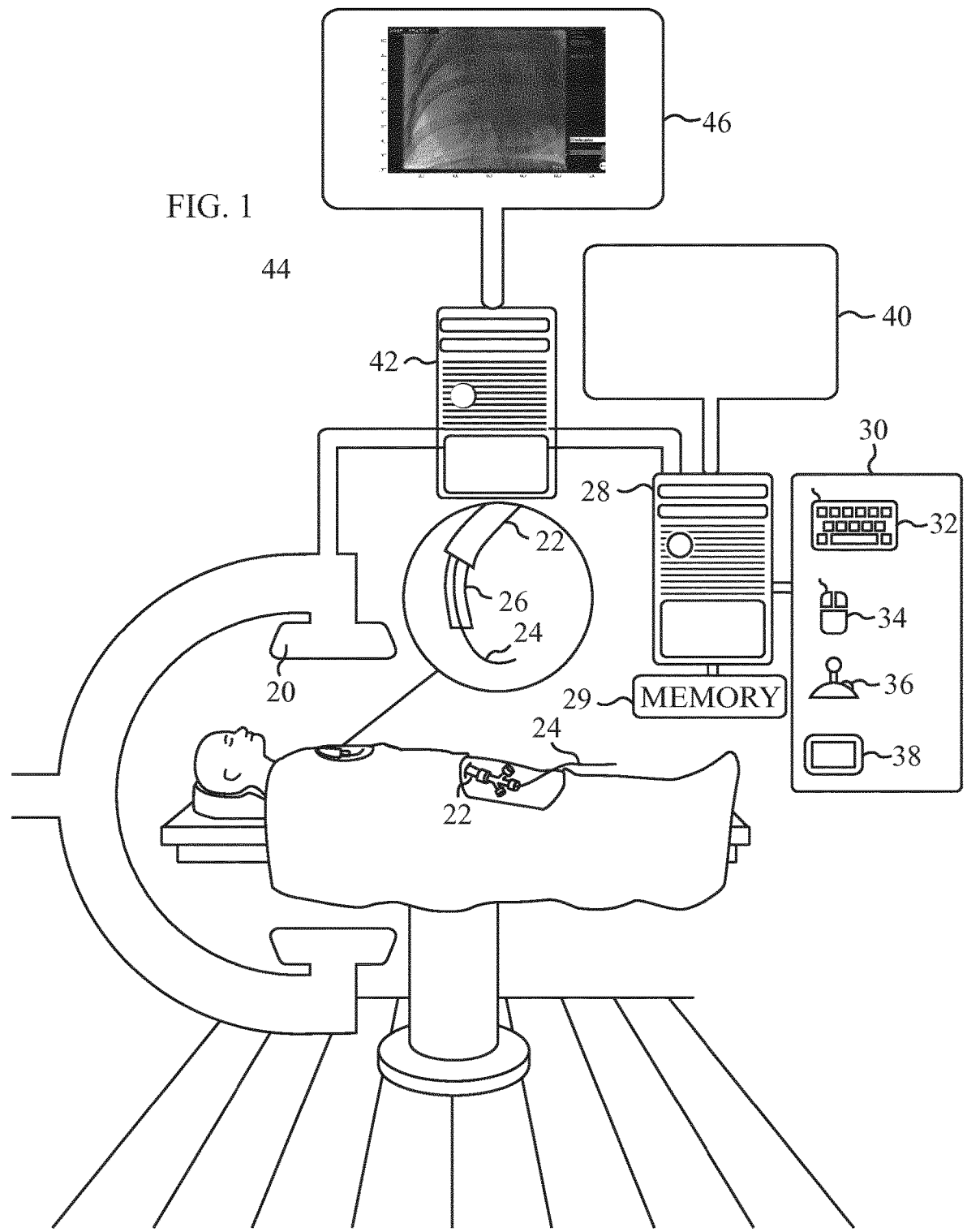
FIG. 1 is a schematic illustration of apparatus that is used in a catheterization laboratory, in accordance with some applications of the present invention.

Reference is now made to FIG. 1, which is a schematic illustration of apparatus that is used in a catheterization laboratory, in accordance with some applications of the present invention. Typically, a subject is imaged using an extraluminal imaging device (i.e., an extraluminal image-acquisition device) 20, which may include a fluoroscope that acquires fluoroscopic images under regular mode (in the absence of contrast agent in the blood vessels of the subject that are being imaged) and/or under angiographic mode (while there is a presence of contrast agent in the blood vessels of the subject that are being imaged). For some applications, the imaging device performs fluoroscopy, CT, MR, PET, SPECT, ultrasound, or any combination thereof.

FIG. 1 additionally shows a guide catheter 22 that has been inserted into a blood vessel of the subject (e.g., a coronary artery of the subject) over a guidewire 24. An endoluminal medical device 26 has been inserted into the subject's blood vessel (e.g., the subject's coronary artery) through the guide catheter and over the guidewire.

For some applications, endoluminal medical device 26 includes an endoluminal data-acquisition device that is configured to acquire data (e.g., functional data or images) from inside the subject's blood vessels. For some applications, the endoluminal data-acquisition device is an imaging probe. For some applications, the imaging probe is an IVUS probe, an EBUS probe, a different type of ultrasound probe, an OCT probe, an NIRS probe, an MR probe, a FACT probe, an OFDI probe, or any combination thereof. For some applications, the endoluminal data-acquisition device performs additional functions. For example, the endoluminal data-acquisition device may comprise a probe, such as the VIBE™ RX Vascular Imaging Balloon Catheter, marketed by Volcano Corporation (San Diego, USA), that includes both IVUS and coronary balloon functionalities.

For some applications, the endoluminal data-acquisition device acquires data in a form other than images. For example, the data may include data related to pressure, flow, temperature, electrical activity, oxygenation, biochemical composition, or any combination thereof. For some applications, and typically when data are acquired with respect to a coronary vessel, the endoluminal data-acquisition device is a Fractional Flow Reserve (FFR) probe, and/or an instantaneous wave-free ratio (iFR) probe. For some applications, FFR and/or iFR measurements are determined by performing image-processing on extraluminal images, and the derived FFR and/or iFR measurements are co-registered with endoluminal images of the lumen, using techniques described herein. For some applications, FFR and/or iFR measurements are determined by performing image-processing on endoluminal images, and the derived FFR and/or iFR measurements are co-registered with extraluminal images of the lumen, using techniques described herein. For some applications, endoluminal images are co-registered with extraluminal images of the lumen, using techniques described herein, and FFR and/or iFR measurements are determined by performing image-processing on the co-registered images.

A computer processor 28 typically receives and processes images (e.g., extraluminal images or endoluminal images). The computer processor communicates with a memory 29. Via a user interface 30, a user (e.g., a physician and/or a catheterization laboratory technician) sends instructions to the computer processor. For some applications, the user interface includes a keyboard 32, a mouse 34, a joystick 36, a touchscreen device 38 (such as a smartphone or a tablet computer), a touchpad, a trackball, a voice-command interface, and/or other types of user interfaces that are known in the art. Typically, the computer processor generates an output using an output device 40. Further typically, the output device includes a display, such as a monitor (as shown in FIG. 1), and the output includes an output that is displayed on the display. For some applications, the display includes a head-up display and/or a head-mounted display, such as Google Glass®. For some applications, the processor generates an output on a different type of visual, text, graphics, tactile, audio, and/or video output device, e.g., speakers, headphones, a smartphone, or a tablet computer. For some applications, user interface 30 acts as both an input device and an output device. For some applications, the processor generates an output on a computer-readable medium (e.g., a non-transitory computer-readable medium), such as a disk, or a portable USB drive.

It is noted that, for some applications, more than one computer processor is used to perform the functions described herein as being performed by computer processor 28. For some applications, more than one extraluminal imaging device is used with computer processor 28. For example, a first extraluminal imaging device may be used to acquire a first set of extraluminal images, and a second extraluminal imaging device may be used to acquire a second set of extraluminal images.

Typically, computer processor 28 is configured to receive images of the subject's body that have been processed by a computer processor 42 of an image-processing system 44. For some applications, images that have been image processed by the computer processor of the image-processing system are displayed on a display 46 of the image-processing system.

FIG. 2 is an example of an extraluminal fluoroscopic image of a subject's chest that has been image processed by a computer processor of an image-processing system (such as computer processor 42 of image-processing system 44), and that is received by computer processor 28, in accordance with some applications of the present invention. Typically, image-processing system 44 artificially adds features to the images that are acquired by one of the imaging devices (e.g., extraluminal imaging device 20, and/or an endoluminal imaging device). For example, the artificially-added features may include features that are added to identify the subject, to show measured data associated with the subject, to identify the image processing system (for example, the image may include a logo associated with the manufacturer of the image-processing system), to classify the image as a certain type of image, or to perform a different function. The features may include alphanumeric characters, icons, pictures, and/or any other type or shape of feature. Many medical imaging systems are configured to add such features (e.g., icons, and/or alphanumeric data) to images that have been acquired by an imaging device.

For some applications of the present invention, computer processor 28 receives an image such as that shown in FIG. 2, and identifies (typically automatically) one or more features that are present within the image that were artificially added to the image, subsequent to acquisition of the image. Computer processor 28 generates an output device on output device 40 in response to the removing the features.

For some applications, the output device is a display (as shown), and the computer processor displays the image that was received from the image-processing system, with the one or more features removed from the image. For example, the features may be masked in the image that is displayed on the display. Alternatively or additionally, computer processor may be configured to identify portions of the image as corresponding to portions of the subject's body (e.g., a blood vessel of the subject, or a lesion within a blood vessel) or a device within or upon the subject's body, and/or to perform measurements upon the identified features. For some applications, before performing the aforementioned identifying and/or measurement steps, the computer processor identifies one or more features that are present within the image that were artificially added to the image. In response thereto, when performing the identifying and/or measurement steps the computer processor takes into account the fact that the one or more features are not features that were imaged by the imaging device.

For example, the computer processor may be configured to identify center-lines and/or edge lines of blood vessels within the image, to identify a lesion within a blood vessel, and/or to perform quantitative analysis on the blood vessel (e.g., using techniques as described in U.S. Pat. No. 8,781, 193 to Steinberg, which is incorporated herein by reference). Alternatively or additionally, the computer processor may be configured to identify devices that are placed inside the subject's body (e.g., using techniques and/or as described in US 2014/0094691 to Steinberg and/or International Patent Application PCT/IL2015/050509 to Klaiman, both of which applications are incorporated herein by reference). For some such applications, computer processor 28 generates an output that is indicative of quantitative analysis that is performed on the blood vessel or the identified device, and/or drives the display to display an image, or a combination of images based upon having identified the vessel center-lines, vessel edge lines, the lesion, and/or the device. For example, the computer processor may coregister endoluminal data with extraluminal images at least partially based upon the identified features, and may generate an output in response thereto, e.g., in accordance with the techniques described in US 2012-0004537 to Tolkowsky and/or US 2014/0094691 to Steinberg, both of which applications are incorporated herein by reference. The computer processor may generate an output based upon the coregistration.

For some applications, before performing any one of the aforementioned steps, computer processor identifies one or more features that are present within the image that were artificially added to the image. In response thereto, the computer does not mistakenly identify such features as corresponding to an anatomical feature or a device that is disposed inside or upon the subject's body. It is noted that it is often the cases that artificially-added features include straight lines (e.g., as in the case of alphanumeric characters). This being the case, the artificially-added features may be mistakenly identified as corresponding to a portion of a blood vessel or a device, if the computer processor does not first identify the features as having been artificially added to the image, e.g., using the techniques described herein.

FIG. 3A-B are flowcharts showing steps of an algorithm that is performed by computer processor 28, in accordance with some applications of the present invention. With reference to FIG. 3A, in step 50, computer processor receives an image. As described hereinabove, for some applications, computer processor receives the image from an image-processing system, such as system 44, which adds artificial features to anatomical images of the subject's body. In step 52, computer processor 28 identifies the artificially-added feature(s), and in step 54, the computer processor generates an output, based upon having identified the feature(s) as having been artificially added.

With reference to FIG. 3B, for some applications, step 52 of FIG. 3A (i.e., the step of identifying artificially-added feature(s)) is performed using some or all of the steps of the following algorithm.

For some applications, in step 60, computer processor selects one or more regions within the image upon which to apply the further steps of the algorithm for identifying artificially-added feature(s) described hereinbelow. Step 60 is shown inside a dashed box, to indicate that step 60 is optional.

For some applications, further steps of the algorithm for identifying artificially-added feature(s) are only applied to a portion of the image. Typically, when image-processing systems artificially add features to images, the features are added to the corners of the images. For example, FIG. 2 shows features that have been added the bottom-right, top-right, and top-left corners of the images. Therefore, for some applications, further steps of the algorithm for identifying artificially-added feature(s) are only applied to pre-defined corner regions of the image, or to pre-defined margins of the images. For example, the pre-defined margins may be defined as a pre-defined percentage of the image (e.g., an upper 10 percent to 30 percent of the image, and or a lower 10 percent to 30 percent of the image), or a pre-defined number of pixels.

For some applications, computer processor is configured to receive an input from a user that is indicative of a region to which to apply further steps of the algorithm for identifying artificially-added feature(s), and is configured to select the region in response thereto. Alternatively or additionally, the computer processor automatically selects the region upon which to apply further steps of the algorithm for identifying artificially-added feature(s).

For some applications, computer processor is configured to apply one or more filters to the selected region. It is noted that although three filters are shown as being applied in parallel such as to generate three binary images, and the binary images are then shown as being combined into a mask image (in step 68), for some applications, not all of the three filters are applied. As such, the scope of the present invention includes applying any one of the filters, and/or any combination thereof.

As shown, in step 62, the computer processor may apply a line-detection filter. For example, the artificially-added features may be white alphanumeric characters. Therefore, for some applications, the computer processor uses a filter to identify sets of pixels that define a line, e.g., as described in U.S. Pat. No. 8,781,193 to Steinberg, which is incorporated herein by reference. For some applications, prior to applying the line-detection filter, the computer processor inverts the image, such that the bright lines of text appear dark. For some applications, the output of applying the filter is a binary image in which the identified lines are assigned a first value, and other pixels within the image are assigned a second value.

Reference is now made to FIG. 4A, which shows an example of a binary image generated by applying a line-detection filter as described above to the image shown in FIG. 2. The identified lines are white and other pixels within the image are black.

Referring again to FIG. 3B, as shown in step 64, the computer processor may apply a line-density filter. For some applications, as an alternative to or in addition to identifying sets of pixels that define lines within the region(s) selected in step 60, the computer processor applies a filter such as to identify regions of the image within which a density of straight lines exceeds a given threshold. For some applications, the output of applying the filter is a binary image in which the regions of the image within which a density of straight lines exceeds a given threshold are assigned a first value, and other pixels within the image are assigned a second value.

Reference is now made to FIG. 4B, which shows an example of a binary image generated by applying a line-density filter as described above to the image shown in FIG. 2. The identified regions are white and other pixels within the image are black.

Referring again to FIG. 3B, as shown in step 64, the computer processor may apply a directional-gradient-density filter. For some applications, as an alternative to, or in addition to, applying steps 62 and 64 within the region(s) selected in step 60, the computer processor applies a directional-gradient-density filter to the region. For some applications, a Sobel filter is applied to the region, in order to extract horizontal and/or vertical gradients. Each of the directional gradients images is then filtered with a large box filter to find regions with an amount of directional gradients that exceeds a threshold. For some applications, the directional gradient images are combined with an AND operator to find regions with both horizontal and vertical gradients that exceed respective thresholds. For some applications, the order in which the aforementioned steps are applied is different to that described above. For example, the AND operator step may be applied before the thresholding step is applied. For some applications, the output of applying the directional-gradient-density filter is a binary image, in which the regions of the image within which a density of directional gradients exceeds a given threshold are assigned a first value, and other pixels within the image are assigned a second value.

Referring again to FIG. 3B, for some applications a single mask image is generated in step 68. For some applications, one or more of steps 62, 64, and 68 are applied in parallel, and the binary image(s) that are generated by applying these steps are combined into a single mask image, e.g., using an AND operator. For some applications, in step 70 the mask that is outputted from step 68 is dilated, e.g., such as to provide a safety margin.

Reference is now made to FIG. 4D, which is a mask image that was generated by combining the binary images shown in FIGS. 4A-C and then dilating the resulting mask, in accordance with some applications of the present invention. Typically, in step 72 of FIG. 3B, the mask that is generated is applied to the original image. Regions of the original image that are within the mask are identified as corresponding to artificially-added features, and features that are not within the mask are not. Typically, in step 54 of FIGS. 3A and 3B, an output is generated in response to identifying the artificially-added features, e.g., as described hereinabove.

Reference is now made to FIG. 5, which is a flowchart showing steps of an algorithm that is performed by a processor, in accordance with some applications of the present invention. For some applications, step 52 of FIG. 3A (i.e., the step of identifying artificially-added feature(s)) is performed using some or all of the steps of the following algorithm.

For some applications, in step 80, computer processor 28 selects one or more regions within the image upon which to apply the further steps of the algorithm for identifying artificially-added feature(s) as described hereinbelow. Step 80 is shown inside a dashed box, to indicate that step 80 is optional. Step 80 is performed in a generally similar manner to step 60 described hereinabove with reference to FIG. 3B.

In step 82, the computer processor identifies a first pixel an intensity of which differs from the intensity of one or more pixels in a vicinity of the first pixel by more than a threshold amount. Typically, this is an indication that the pixel may correspond, for example to a white alphanumeric character (or other symbol) that has been artificially added to a region of the image that has a generally dark background.

Typically, features that are added automatically to images are added to the same place in each of a set of images that is outputted by an image processing system. For example, if the manufacturer of the image-processing system adds their logo to each of the images, the logo is typically added to the same place in each of the images. Or, if the subject's name is added to the images, then the name is typically added to the same place in each of the images. Therefore, in step 84, the pixel that was identified as potentially corresponding to an artificially-added feature in step 82 is identified in one or more additional images, and the computer processor determines whether the difference between the value of the pixel in the images differs by less than a threshold amount. In response to the detecting that the difference is less than a threshold amount, the computer processor identifies the feature as corresponding to an artificially-added feature. For some applications, steps 82 and 84 are performed in reverse order.

In step 86, the computer processor generates a mask in the region of a pixel that has been identified as corresponding to an artificially-added feature. For some applications, in step 88, the computer processor dilates the resultant mask. It is noted that, typically, steps 82, 84, and 86 are applied to more than one pixel within the region selected in step 80. Typically, the computer processor applies steps 82, 84 and 86 to a plurality of pixels (e.g., all of the pixels) within the region selected in step 80, such as to identify all pixels within the region that (a) differ in intensity from the intensity of a pixel within the vicinity by more than a threshold amount, and (b) differ in value from the value of the pixel in one or more additional images by less than a threshold amount. In this manner, all pixels that correspond to artificially-added features are identified.

Typically, in step 90 the mask that is generated is applied to the original image. Regions of the original image that are within the mask are identified as corresponding to artificially-added features, and features that are not within the mask are not. Typically, in step 54, an output is generated in response to identifying the artificially-added features, as described hereinabove.

It is noted that although some techniques described herein are described primarily with respect to extraluminal fluoroscopic/angiographic images, the scope of the present invention includes applying the techniques described herein to other forms of extraluminal images, mutatis mutandis. For example, the extraluminal images may include images generated by fluoroscopy, CT, MRI, ultrasound, PET, SPECT, other extraluminal imaging techniques, or any combination thereof. Endoluminal images may include images generated by intravascular ultrasound (IVUS) optical coherence tomography (OCT), near-infrared spectroscopy (NIRS), intravascular ultrasound (IVUS), endobronchial ultrasound (EBUS), magnetic resonance (MR), other endoluminal imaging techniques, or any combination thereof. Endoluminal data may include data related to pressure (e.g., fractional flow reserve), flow, temperature, electrical activity, or any combination thereof.

Although some techniques described herein are described primarily as being performed on a blood vessel, the scope of the present application includes performing similar techniques on a lumen in the vascular system, the respiratory tract, the digestive tract, the urinary tract, any other luminal structure within a patient's body, or any other suitable anatomical structure within a patient's body, mutatis mutandis. Examples of an anatomical structure to which the techniques described herein may be applied include a coronary vessel, a coronary lesion, a vessel, a vascular lesion, a lumen, a luminal lesion, and/or a valve.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 29) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the C programming language or similar programming languages.

It will be understood that each block of the flowcharts shown in FIGS. 3A-B and 5 and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the flowcharts and/or algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or algorithms described in the present application.

Computer processor 28 is typically a hardware device programmed with computer program instructions to produce a special purpose computer. For example, when programmed to perform the algorithms described with reference to FIGS. 3A-B and 5, computer processor 28 typically acts as a special purpose feature-identification computer processor. Typically, the operations described herein that are performed by computer processor 28 transform the physical state of memory 29, which is a real physical article, to have a different magnetic polarity, electrical charge, or the like depending on the technology of the memory that is used.

The terms "medical tool," "tool", "device," and "probe" as used in the specification and the claims of the present application may refer to any type of a diagnostic or therapeutic or other functional tool. By way of example, such tools may include a cardiovascular catheter, a stent delivery, placement and/or retrieval tool, a balloon delivery and/or placement and/or retrieval tool, a valve delivery and/or repair and/or placement and/or retrieval tool, a graft delivery and/or placement and/or retrieval tool, a tool for the delivery and/or placement and/or retrieval of an implantable device or of parts of such device, an implantable device or parts thereof, a tool for closing a gap, a tool for closing a septal defect, a guide wire, a marker wire, a suturing tool, a clipping tool (such as a valve-leaflet-clipping tool), a biopsy tool, an aspiration tool, a navigational tool, a localization tool, a probe comprising one or more location sensors, a tissue characterization probe, a probe for the analysis of fluid, a measurement probe, an electrophysiological probe, a stimulation probe, an ablation tool, a tool for penetrating or opening partial or total occlusions in blood vessels, a drug or substance delivery tool, a chemotherapy tool, a photodynamic therapy tool, a brachytherapy tool, a local irradiation tool, a laser device, a tool for delivering energy, a tool for delivering markers or biomarkers, a tool for delivering biological glue, an irrigation device, a suction device, a ventilation device, a device for delivering and/or placing and/or retrieving a lead of an electrophysiological device, a lead of an electrophysiological device, a pacing device, a coronary sinus device, an imaging device, a sensing probe, a probe comprising an optical fiber, a robotic tool, a tool that is controlled remotely, an excision tool, a plaque excision tool (such as a plaque excision catheter), or any combination thereof. Alternatively, the terms "medical tool," "tool", "device," and "probe" as used in the specification and the claims of the present application may refer to a different type of tool and/or medical tool.

The terms "image" and "imaging" as used in the specification and the claims of the present application may refer to any type of medical images or imaging, typically resulting in the generation of a sequence of images. For example, such imaging may include imaging using ionizing radiation, imaging using non-ionizing radiation, video, fluoroscopy, angiography, ultrasound, CT, MR, PET, PET-CT, CT angiography, SPECT, Gamma camera imaging, Optical Coherence Tomography (OCT), Near-Infra-Red Spectroscopy (NIRS), Vibration Response Imaging (VRI), optical imaging, infrared imaging, electrical mapping imaging, other forms of functional imaging, Focused Acoustic Computed Tomography (FACT), Optical Frequency Domain Imaging (OFDI), or any combination or fusion thereof. Examples of ultrasound imaging may include Endo-Bronchial Ultrasound (EBUS), Trans-Thoracic Echo (TTE), Trans-Esophageal Echo (TEE), Intra-Vascular Ultrasound (IVUS), Intra-Cardiac Ultrasound (ICE), or any combination thereof. Alternatively, the terms "image" and "imaging" as used in the specification and the claims of the present application may refer to imaging using a different imaging modality from the above-described imaging modalities.

The term "contrast agent," as used in the specification and the claims of the present application may include any substance that is used to enhance the visibility of the anatomical structure, functioning, and/or composition of a bodily organ while the organ is being imaged, e.g., by highlighting the anatomical structure, functioning, and/or composition of a bodily organ.

The scope of the present application includes combining the apparatus and methods described herein with apparatus and methods described in any one of the following applications, all of which are incorporated herein by reference:

International Application PCT/IL2008/000316 to Iddan (published as WO 08/107905), filed Mar. 9, 2008, entitled "Imaging and tools for use with moving organs."

U.S. patent application Ser. No. 12/075,252 to Iddan (published as US 2008/0221440), filed Mar. 10, 2008, entitled "Imaging and tools for use with moving organs;"

International Application PCT/IL2009/000610 to Iddan (published as WO 09/153794), filed Jun. 18, 2009, entitled "Stepwise advancement of a medical tool;"

U.S. patent application Ser. No. 12/487,315 to Iddan (issued as U.S. Pat. No. 8,700,130), filed Jun. 18, 2009, entitled "Stepwise advancement of a medical tool;"

U.S. patent application Ser. No. 12/666,879 to Steinberg (issued as U.S. Pat. No. 8,781,193), which is the US national phase of PCT Application No. PCT/IL2009/001089 to Cohen (published as WO 10/058398), filed Nov. 18, 2009, entitled "Image processing and tool actuation for medical procedures;"

U.S. patent application Ser. No. 12/781,366 to Cohen (published as US 2010/0222671), filed May 17, 2010, entitled "Identification and presentation of device-to-vessel relative motion;"

International Patent Application PCT/IL2011/000391 to Cohen (published as WO 11/145094), filed May 17, 2011, entitled "Identification and presentation of device-to-vessel relative motion;"

U.S. Ser. No. 13/228,229 to Tolkowsky (published as US 2012/0004537), filed Sep. 8, 2011, which is a continuation of International Application No. PCT/IL2011/000612 to Tolkowsky (published as WO 12/014212), filed 28 Jul. 2011 entitled "Co-use of endoluminal data and extraluminal imaging;"

U.S. patent application Ser. No. 14/128,243 to Barzelay (published as US 2014/0140597), which is the US national phase of International Patent Application PCT/IL2012/000246 (published as WO 12/176191), filed Jun. 21, 2012, entitled "Luminal background cleaning;"

U.S. patent application Ser. No. 14/097,922 to Steinberg (published as US 2014/0094691), filed Dec. 5, 2013, entitled "Co-use of endoluminal data and extraluminal imaging," which is a continuation of International Application PCT/IL2013/050438 (published as WO 13/175472) to Steinberg, filed May 21, 2013, entitled "Co-use of endoluminal data and extraluminal imaging;"

U.S. patent application Ser. No. 14/142,082 to Tolkowsky (published as US 2014/0121513), filed Dec. 27, 2013, entitled "Determining a characteristic of a lumen by measuring velocity of a contrast agent," which is a continuation of International Application PCT/IL2013/050549 (published as WO 14/002095) to Tolkowsky, filed Jun. 26, 2013, entitled "Flow-related image processing in luminal organs;"

International Patent Application PCT/IL2015/050372 to Klaiman, filed Apr. 2, 2015, entitled "Image analysis in the presence of a medical device," which claims priority from U.S. Provisional Patent Application 61/977,891 to Klaiman, filed Apr. 10, 2014, entitled "Image analysis in the presence of a medical device;" and International Patent Application PCT/IL2015/050509 to Klaiman, filed May 13, 2015, entitled "Object identification," which claims priority from US Provisional Patent Application 61/993,123 to Klaiman, filed May 14, 2014, entitled "Image analysis in the presence of a medical device."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method comprising:
receiving, via at least one computer processor, at least one image of a portion of a subject's body, wherein the image includes a feature that was artificially added subsequent to acquisition of the image;
using the at least one computer processor, identifying the feature within the image, wherein identifying the feature comprises:
comparing a first difference in intensity between a first pixel of the image and a second pixel of the image to a first threshold, wherein the second pixel is within a given distance from the first pixel; and
identifying a region of the image that contains the first pixel as containing the feature, based on comparing the first difference and the first threshold; and
in response thereto, generating an output on an output device, wherein generating the output comprises driving a display to display the image with the feature removed from the image.

2. The method according to claim 1, further comprising, using the computer processor, performing measurements upon the image, by excluding the identified feature from being included in the measurements, wherein generating the output comprises generating an indication of the measurements upon the output device.

3. The method according to claim 1, wherein identifying the feature further comprises determining that the feature is located within a given distance of an edge of the image, and identifying the feature as having been artificially added to the image, subsequent to acquisition of the image.

4. The method according to claim 1, wherein identifying the feature further comprises identifying alphanumeric characteristics that are present within the image.

5. The method according to claim 1, wherein identifying the feature further comprises identifying a set of pixels as defining a line and identifying the set of pixels as corresponding to the feature.

6. The method according to claim 1, wherein identifying the feature further comprises identifying a region of the image within which a density of straight lines exceeds a threshold and identifying the region as containing the feature.

7. The method according to claim 1, wherein identifying the feature further comprises determining that a density of horizontal and vertical gradients within a given region of the image exceeds a threshold and identifying the region as containing the feature.

8. The method according to claim 1, wherein identifying the feature further comprises:

comparing a second difference in intensity between the first pixel in the image and the first pixel in one or more additional images of the portion of the subject's body to a second threshold; and identifying a region that contains the first pixel as containing the feature, based on the comparing the second difference and the second threshold.

9. Apparatus comprising:

an imaging device configured to acquire an image of a portion of a body of a subject;

an output device; and at least one computer processor configured to:
- receive, from the imaging device, the image of the portion of the subject's body, wherein the image includes a feature that was artificially added subsequent to acquisition of the image;
- identify the feature within the image by:
  - comparing a first difference in intensity between a first pixel of the image and a second pixel of the image to a first threshold, wherein the second pixel is within a given distance from the first pixel; and
  - identifying a region of the image that contains the first pixel as containing the feature, based on comparing the first difference and the first threshold; and
- in response thereto, generate an output on the output device by driving a display to display the image with the feature removed from the image.

10. The apparatus according to claim 9, wherein the computer processor is configured to perform measurements upon the image, by excluding the identified feature from being included in the measurements, and wherein the computer processor is configured to generate the output by generating an indication of the measurements upon the output device.

11. The apparatus according to claim 9, wherein the computer processor is further configured to identify the feature by determining that the feature is located within a given distance of an edge of the image, and identifying the feature as having been artificially added to the image, subsequent to acquisition of the image.

12. The apparatus according to claim 9, wherein the computer processor is further configured to identify the feature by identifying alphanumeric characteristics that are present within the image.

13. The apparatus according to claim 12, wherein the computer processor is further configured to identify the feature by at least one of:
- identifying a set of pixels as defining a line and identifying the set of pixels as corresponding to the feature;
- identifying a region of the image within which a density of straight lines exceeds a threshold and identifying the region as containing the feature; and
- determining that a density of horizontal and vertical gradients within a given region of the image exceeds a threshold and identifying the region as containing the feature.

14. The apparatus according to claim 12, wherein the computer processor is further configured to identify the feature by:
- comparing a second difference in intensity between the first pixel in the image and the first pixel in one or more additional images of the portion of the subject's body to a second threshold amount; and
- identifying a region that contains the first pixel as containing the feature, based on comparing the second difference and the second threshold.

15. A computer software product, for use with an imaging device configured to acquire an image of a portion of a body of a subject, and an output device, the computer software product comprising a non-transitory computer-readable medium in which program instructions are stored, which instructions, when read by a computer cause the computer to perform the steps of the method according to claim 1.

16. The apparatus according to claim 9, wherein the computer processor is configured to identify the feature by determining that the first difference exceeds the first threshold.

17. The apparatus according to claim 14, wherein the computer processor is configured to identify the feature by determining that the second difference is less than the second threshold.

* * * * *